Aug. 12, 1924.  
T. HILTON  
1,505,025  
RESILIENT SUPPORTING SURFACE, MATTRESS, AND THE LIKE  
Filed March 29, 1924   3 Sheets-Sheet 1
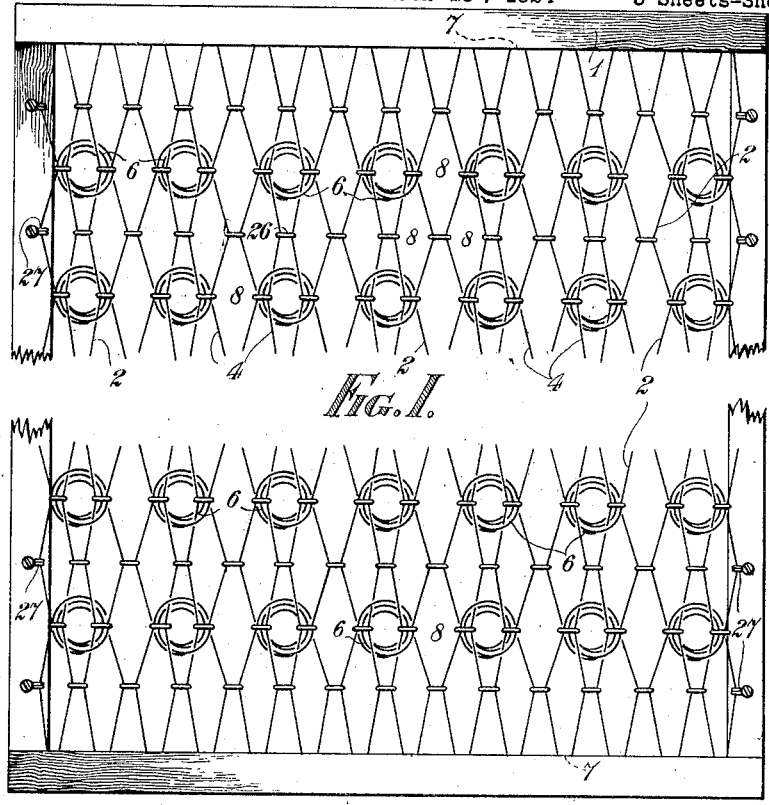
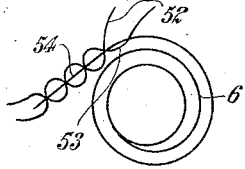
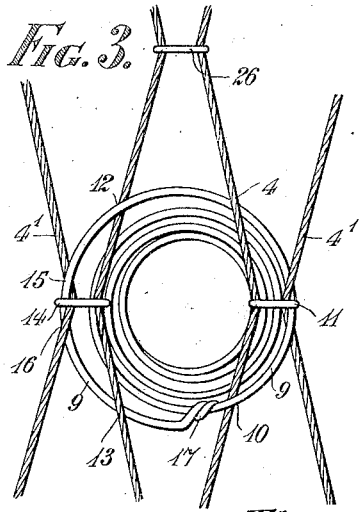
INVENTOR
*Thomas Hilton*
BY
ATTORNEY Aug. 12, 1924.　　　　　　　　　　　　　　　　1,505,025
T. HILTON
RESILIENT SUPPORTING SURFACE, MATTRESS, AND THE LIKE
Filed March 29, 1924　　　3 Sheets-Sheet 2
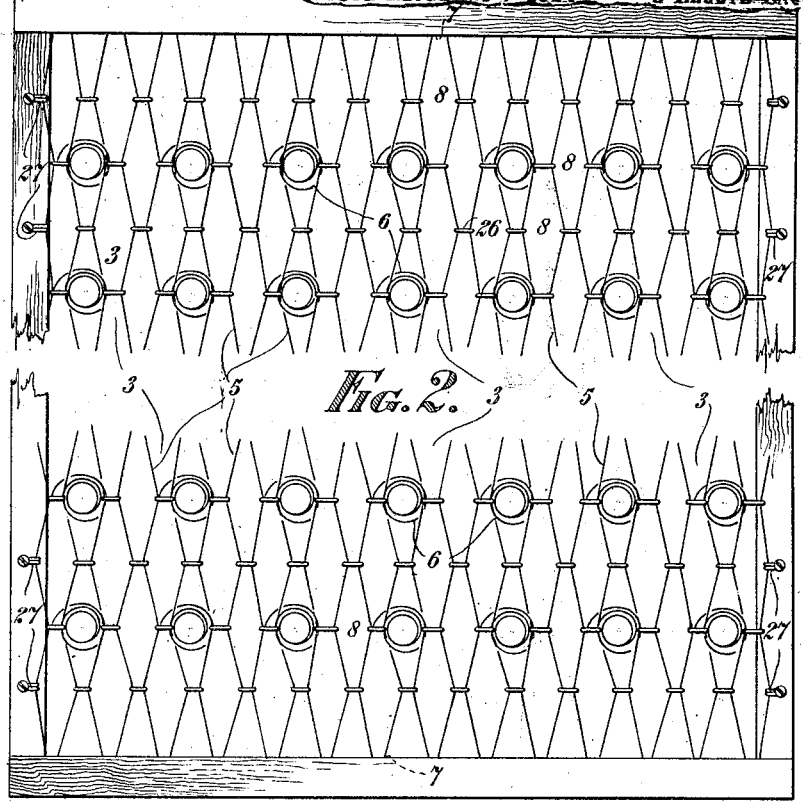
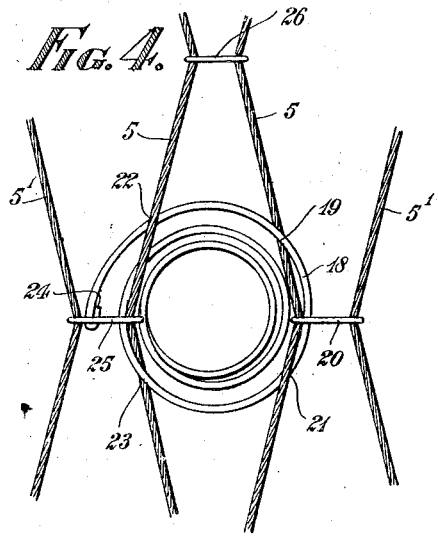
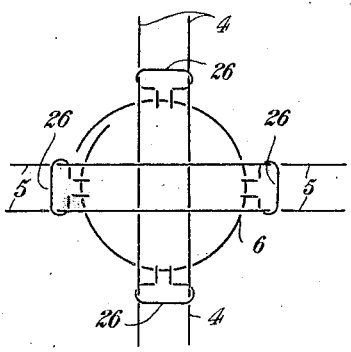
INVENTOR
*Thomas Hilton*
BY
ATTORNEY Aug. 12, 1924. 1,505,025
T. HILTON
RESILIENT SUPPORTING SURFACE, MATTRESS, AND THE LIKE
Filed March 29, 1924   3 Sheets-Sheet 3
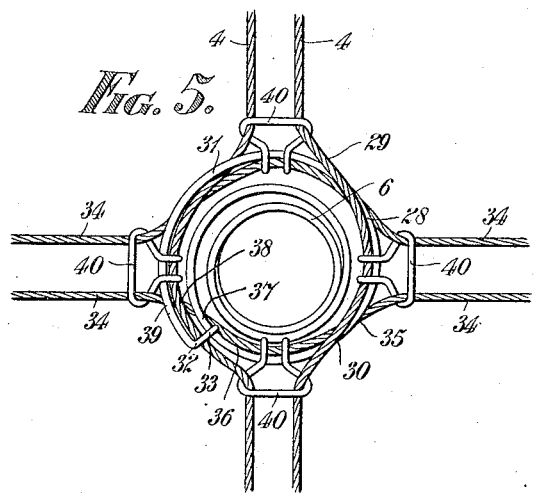
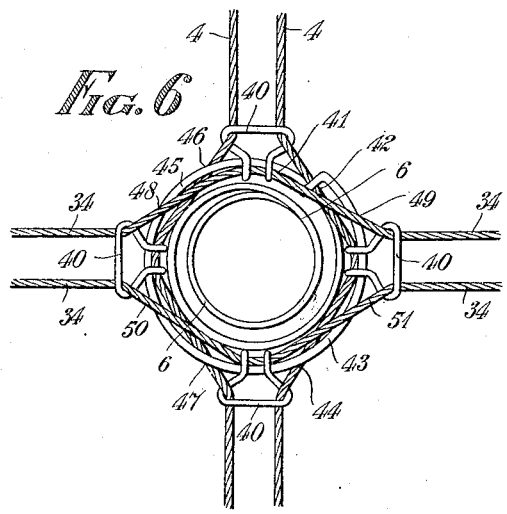

Patented Aug. 12, 1924.

1,505,025

UNITED STATES PATENT OFFICE.

THOMAS HILTON, OF LONDON, ENGLAND.

RESILIENT SUPPORTING SURFACE, MATTRESS, AND THE LIKE.

Application filed March 29, 1924. Serial No. 702,900.

*To all whom it may concern:*

Be it known that I, THOMAS HILTON, a subject of the King of Great Britain, residing at 11 and 13, Cleveland Mews, Maple Street, Tottenham Court Road, London W. 1, Kingdom of England, have invented certain new and useful Improvements in or relating to Resilient Supporting Surfaces, Mattresses, and the like, of which the following is a specification.

This invention relates to resilient supporting surfaces, such as reversible spring mattresses seats and the like and has for its object to provide an improved construction of resilient supporting surface for a reversible spring mattress, couch, sofa, seat and the like which is provided with two such supporting surfaces, one of which forms the equivalent of a soft bed or soft seat, the other surface forming the equivalent of a hard bed or hard seat.

The invention is hereinafter described with reference to a mattress having two resilient surfaces, from which the nature of its application generally will be readily understood.

According to the present invention the mattress is provided with two resilient surfaces one of which forms the equivalent of a soft bed and the other surface the equivalent of a hard bed, each of which resilient surfaces is formed of a plurality of zebra cords which are stretched to their elastic limit before or after their application to the mattress frame, double helical or like springs being interposed between the two layers of zebra cords. Each resilient surface is formed by a number of zebra cords, the formation of which is described in my prior Patent No. 27,272/09, the zebra cords of each surface being of different lengths and preferably of different gauge of wire, that is to say, the zebra cords of the resilient surface forming the equivalent of the hard bed are of one length and gauge and the zebra cords forming the resilient surface of the equivalent of the soft bed are of a different length and gauge, the two surfaces being separated by double helical or like springs. In preparing each resilient surface the zebra cords are stretched to their elastic limit as described in my prior patent aforesaid and the ends of these zebra cords are subsequently secured to the frame of the mattress. Either surface may have zebra cords in the same direction or they may be in different directions on one or both of the surfaces. The zebra cords are preferably arranged in parallel rows and inter-connected to form a diamond shaped mesh or a latticework mesh, the double helical or like springs being interposed between the two surfaces and interconnected with the said cords preferably in a manner such as to maintain the springs extended rigidly in position. It is preferred that these springs be connected to the zebra cords in the following manner: One zebra cord is passed over the outer convolution of the coil forming the base of a spring and then under and out of the same convolution and both the cord and the spring are then clamped or securely hooked to an adjacent zebra cord at the same side of the same convolution. A zebra cord on the opposite side of the same convolution of the spring is first of all passed under the said convolution of the coil and then over and out of the said convolution at the same side thereof and both are then securely clamped or hooked to an adjacent zebra cord. The convolution of the coil abutting against the other resilient surface is connected to the adjacent zebra cords in a similar manner, or in any other suitable manner. The zebra cords are otherwise preferably rigidly interconnected and clamped to each other or to the mattress frame by pieces of wire formed into an oval or other suitably shaped ring or by springs so as to prevent relative sliding of the cords, and there may be any desired number of double helical springs arranged longitudinally and laterally of the mattress.

In order that the invention may be clearly understood reference is made to the accompanying drawings which shew by way of example the application of the invention to a double surface mattress.

Figure 1 is a plan of a mattress, the surface of which is prepared in accordance with the present invention, the said surface being of a soft nature.

Figure 2 is a plan of the opposite side of the mattress shewn in Figure 1, the surface thereof being of a hard nature.

Figure 3, as seen looking directly on the soft side of the mattress shews the lacing of the springs to form the soft surface, and Figure 4, as seen looking directly on the hard side of the mattress shews the lacing of the springs to produce the hard surface.

Figures 5 and 6 shew a modified form of lacing the springs with the zebra cords, Figure 5 shewing the lacing on the soft side and Figure 6 the lacing on the hard side.

Figure 7 shews a further modified form of lacing the springs with the zebra cords.

Figure 8 shews the manner of lacing the ends of the springs with a woven wire surface.

Referring to the drawing, 1 is the mattress frame which is provided on one side with a resilient surface 2 which forms the equivalent of a soft bed and on the other side with a resilient surface 3 which forms the equivalent of a hard bed. Each resilient surface is formed by a number of zebra cords, the formation of which is described in my prior patent aforesaid, the zebra cords 4 forming part of the soft-bed surface being longer and preferably of different gauge of wire than the zebra cords 5 which form part of the hard-bed surface, that is to say, the zebra cords 5 of the resilient surface forming the equivalent of the hard bed are of one length and gauge and the zebra cords 4 forming the resilient surface of the equivalent of the soft bed are longer and of lighter gauge than the zebra cords of the hard-bed surface, the two surfaces being separated by double helical or like springs 6. In preparing each resilient surface the zebra cords of both surfaces are stretched to their elastic limit as described in my prior patent aforesaid and the ends of these zebra cords are subsequently secured in any suitable manner to the frame of the mattress, as shewn at 7, Figures 1 and 2. Either surface may have zebra cords in the same direction or they may be in different directions on one or both of the surfaces. The zebra cords 4 and 5 are preferably arranged in parallel rows and interconnected to form a diamond shaped mesh 8 or a latticework mesh, the double helical or like springs 6 being interposed between the two surfaces and interconnected with the said cords preferably in a manner such as to maintain the springs rigidly in position. It is preferred that these springs be connected to the zebra cords in the following manner: One zebra cord 4 is passed over the outer convolution 9 of the coil forming the base of a spring and then under and out of the same convolution as shewn at 10 in Figure 3 and both the cord and the spring are then securely interconnected and clamped as at 11 or securely hooked to an adjacent zebra cord 4' at the same side of the same convolution 9. A zebra cord 4 on the opposite side of the same convolution 9 of the same spring is first of all passed under the said convolution 9 as at 12 of the coil and then over and out of the said convolution 9 at the same side thereof as at 13 and both are then securely clamped or hooked as at 14 to an adjacent zebra cord 4' which passes under the convolution 9 as at 15 and then over the convolution 9 as at 16. The convolution 9 is connected to the adjacent coil as at 17. The convolution 18 of the coil abutting against the zebra cords 5 of the other resilient hard surface is connected to the adjacent zebra cords 5 as follows, it being clearly understood that Figure 4 is a view looking directly on the hard surface and not through the soft surface onto the bottom of the spring. The zebra cord 5 passes under the outer convolution 18 as at 19 and through a clip 20 and then out over the convolution 18 as at 21. The clip 20 engages an adjacent zebra cord 5' and the convolution 18 and cord 5 are also rigidly interconnected and clamped by the clip 20. On the opposite side of the spring the zebra cord 5 passes over the outer convolution 18 as shewn at 22 and then under the said convolution as shewn at 23, the outer end 24 of the convolution being securely engaged with a clip 25 which also securely engages an adjacent zebra cord 5' so that the clip 25 is interlocked or interengaged and clamped on the zebra cord 5', the end of the outer convolution of the spring and an adjacent zebra cord 5. This arrangement of lacing tends to extend the springs and maintains the mattress in its resilient condition. The zebra cords 4 and 5 are securely interconnected and clamped as at 26 to each other (Figures 1, 2, 3 and 4) and the cords are also rigidly interconnected and clamped together and to the mattress frame as at 27 by pieces of wire formed into an oval or other suitably shaped ring or by springs and there may be any desired number of double helical springs arranged longitudinally and laterally of the mattress.

As before, 6 is the spring and it should be clearly understood that both Figures 5 and 6 are views looking directly on the soft and hard sides respectively of the mattress. In Figure 5, 4 is a zebra cord which passes over the outer convolution 28 of the spring as shewn at 29, the said zebra cord also passing out over the convolution 28 as at 30. On the opposite side of the spring the zebra cord 4 passes under the outer convolution 28 as at 31 and 32 but if desired the zebra cord 4, instead of passing outside the knot 33 of the spring may be passed through the said knot. In this arrangement of lacing zebra cords arranged transversely are also provided, these cords being referred to as 34. One of the lateral zebra cords 34 passes under the outer convolution 28 as at 35 and at the other side of the same cord passes under the adjacent convolution 36 as at 37 and also under the zebra cord 4 and the outer convolution 28 as at 38 and 39 respectively. The arrangement of the upper zebra cord 34 is precisely the same. After these cords have been interlaced with the spring, three cords are interengaged and if desired clamped by a clip as shewn at 40.

In Figure 6 the zebra cord 4 passes over the penultimate convolution 41 of the spring as at 42 and out under the outer convolution 43 as at 44. The arrangement on the other side of the spring is such that the zebra cord 4 passes across the spring and under the convolutions 45 as shewn at 46 and 47 respectively. The lateral zebra cords 34 pass across the spring outside the outer convolution thereof as shewn at 48, 49, 50 and 51. The zebra cords are then interlaced and tensioned in the manner shewn by the clips 40 as in Figure 5.

As shewn in Figure 7 the zebra cords are arranged in transverse and longitudinal pairs as shewn at 4 and 5 one pair of zebra cords being superimposed on the other pair and each pair being interconnected with, and if desired, clamped to the upper convolution of a spring 6 by means of oppositely disposed hooks or clips 26, each of which tension a pair of cords and connects such pair of cords to the upper convolution of the spring.

In Figure 8, 52 indicates the wires of the woven wire surface. Each spring 6 (or any desired number of springs) in this construction has its end straightened out as shewn at 53 and this end is passed through the convolutions of one of the wires of the woven wire surface as at 54. Such wires may be either longitudinal or transverse wires.

If so desired the outer convolution of the base portion of each double helical spring may have the hooked portion or "knot" 17 or 24 which connects the said outer convolution 9 or 18 to the adjacent convolution removed and the end of each convolution may be interconnected with an adjacent zebra cord and its end turned through or around the connecting hook or ring. The resilient surface forming the equivalent of a hard bed may be adjusted in any well known and suitable manner or by tensioned springs as described in the specification of prior Letters Patent No. 2036/14 granted to me, likewise the resilient surface forming the equivalent of a soft bed. The soft bed may have a woven wire surface with the unknotted end of each spring straightened out and passed through the convolutions of one of the wires of the woven wire surface, in which case the zebra cords of the soft bed may be dispensed with.

A mattress constructed as hereinbefore described is provided with two surfaces, the double helical springs between the surfaces being rigidly interconnected, clamped and silently held in position by the interconnection of the zebra cords in the manner hereinbefore described so that there is no possibility under ordinary circumstances of the said double helical springs becoming displaced laterally or sideways while still allowing of a greater resilient movement in a more or less vertical direction than is possible where the springs rest on a solid base of rigid struts.

The invention may be applied to the seats of chairs, to couches, to sofas and other seats of a similar nature.

What I claim is:—

1. A reversible spring mattress, comprising a series of double helical springs, series of cords stretched across the bases of said springs and secured thereto, means connecting the cords together in pairs midway between the springs, and means at each side of each spring securing each cord to each spring it crosses and also securing it near that point to the adjacent cord of the next pair.

2. A reversible spring mattress, each face of which comprises a series of cords stretched longitudinally thereacross, means securing each cord alternately to the adjacent cords on either side thereof to form a diamond mesh, and double helical springs interposed between the two series of cords, the outer convolution of each spring base being secured to a cord at each side by one of said securing means.

3. A reversible spring mattress, each face of which comprises a series of cords stretched longitudinally thereacross, a clip securing each cord alternately to the adjacent cords on either side thereof to form a diamond mesh, double helical springs interposed between the two series of cords, the outer convolution of each spring base being secured to a cord at each side by one of said clips, each cord passing through the outer convolution of each spring which it crosses, one cord passing over and under a convolution while the next adjacent cords pass under and over the same.

4. A spring mattress, comprising a series of helical springs, series of cords stretched across said springs and secured thereto, means connecting the cords together in pairs midway between the springs, and means securing each cord to each spring it crosses and also securing it near that point to the adjacent cord of the next pair, one cord of each pair passing under and over the outer convolution of the spring, and an adjacent cord passing over and under the same convolution.

5. In a spring mattress, the combination of a series of helical springs arranged in longitudinal rows, a series of cords stretched longitudinally across and secured to the bases of said springs, there being four cords to each row of springs, the two inner cords converging from each spring toward the mid-points between the springs where said cords are connected to each other, and the two outer cords diverging from each spring and each being connected midway between the springs to the nearest cord of the next row of springs.

6. In a spring mattress, the combination of a series of helical springs arranged in longitudinal rows, a series of cords stretched longitudinally across and secured to the bases of said springs, and means alternating with the springs to connect the cords together in pairs, there being at least one pair of cords for each row of springs, the individual cords of which converge from their respective connections with the springs toward the point where they are connected together, the points of convergence lying on a line running centrally of the row of springs.

7. In a spring mattress, the combination of a longitudinal row of helical springs, a pair of cords stretched longitudinally of said row and connected with each of the springs, and means alternating with the springs to connect the cords of the pair to each other, said cords converging from their respective connections with the springs to the point where they are connected to each other.

In testimony whereof I have hereunto signed my name.

THOMAS HILTON.